(12) United States Patent
Archetti

(10) Patent No.: US 10,196,949 B2
(45) Date of Patent: Feb. 5, 2019

(54) METHOD AND SYSTEM FOR THE REMOVAL OF PARTICULATE MATTER FROM ENGINE EXHAUST GAS OR PROCESS EQUIPMENT

(71) Applicants: Haldor Topsøe A/S, Kgs. Lyngby (DK); Ecospray Technologies S.r.l., Alzano Scrivia (IT)

(72) Inventor: Maurizio Archetti, Verscio (CH)

(73) Assignees: Haldor Topsøe A/S, Lyngby (DK); Ecospray Technologies S.r.l., Alzano Scrivia (IT)

( * ) Notice: Subject to any disclaimer, the term of this patent is extended or adjusted under 35 U.S.C. 154(b) by 0 days.

(21) Appl. No.: 15/560,043

(22) PCT Filed: Mar. 17, 2016

(86) PCT No.: PCT/EP2016/055774
§ 371 (c)(1),
(2) Date: Sep. 20, 2017

(87) PCT Pub. No.: WO2016/150805
PCT Pub. Date: Sep. 29, 2016

(65) Prior Publication Data
US 2018/0073406 A1 Mar. 15, 2018

(30) Foreign Application Priority Data
Mar. 23, 2015 (DK) .................................. 2015 00177

(51) Int. Cl.
*F01N 3/035* (2006.01)
*F01N 3/023* (2006.01)
(Continued)

(52) U.S. Cl.
CPC .......... *F01N 3/035* (2013.01); *B01D 46/0061* (2013.01); *B01D 46/0068* (2013.01);
(Continued)

(58) Field of Classification Search
CPC ............ B01D 46/0068; B01D 2279/30; B01D 46/0057; B01D 2259/4566;
(Continued)

(56) References Cited

U.S. PATENT DOCUMENTS 5,214,020 A 5/1993 Shimoda
5,253,476 A * 10/1993 Levendis ................ F01N 3/023
55/302
(Continued)

FOREIGN PATENT DOCUMENTS

DE 37 09 671 A1 10/1988
EP 1 493 484 B1 3/2007
(Continued)

*Primary Examiner* — Timothy C Vanoy
(74) *Attorney, Agent, or Firm* — Blank Rome LLP

(57) ABSTRACT

Method and system for removal of particles such as soot, ash and heavy metals, and optionally additionally $NO_X$ and $SO_X$ being present in exhaust gas from an engine or process equipment.

24 Claims, 2 Drawing Sheets

Figure 1:
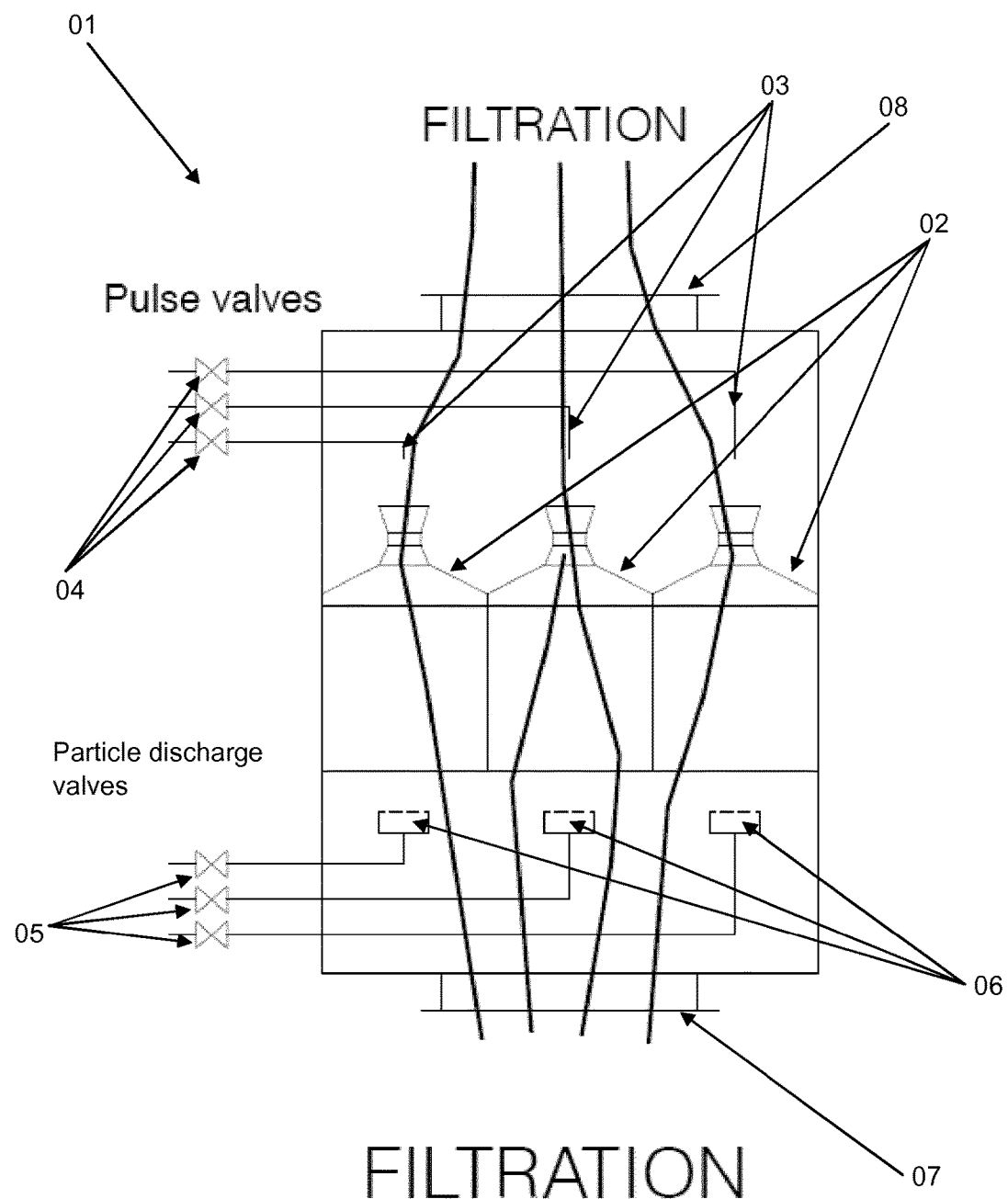

(51) Int. Cl.

| | | |
|---|---|---|
| *F01N 3/20* | (2006.01) | |
| *F01N 3/28* | (2006.01) | |
| *F01N 3/30* | (2006.01) | |
| *F01N 13/00* | (2010.01) | |
| *B01J 21/06* | (2006.01) | |
| *B01J 23/30* | (2006.01) | |
| *B01J 23/44* | (2006.01) | |
| *B01J 35/04* | (2006.01) | |
| *C04B 38/00* | (2006.01) | |
| *B01D 53/94* | (2006.01) | |
| *B01D 46/00* | (2006.01) | |

(52) U.S. Cl.
CPC ........ *B01D 53/9418* (2013.01); *B01J 21/063* (2013.01); *B01J 23/30* (2013.01); *B01J 23/44* (2013.01); *B01J 35/04* (2013.01); *C04B 38/0006* (2013.01); *F01N 3/0232* (2013.01); *F01N 3/0233* (2013.01); *F01N 3/0234* (2013.01); *F01N 3/2066* (2013.01); *F01N 3/2803* (2013.01); *F01N 3/30* (2013.01); *F01N 13/009* (2014.06); *B01D 2255/1023* (2013.01); *B01D 2255/20707* (2013.01); *B01D 2255/20723* (2013.01); *B01D 2255/20776* (2013.01); *B01D 2255/9155* (2013.01); *B01D 2279/30* (2013.01); *F01N 2510/06* (2013.01); *F01N 2590/02* (2013.01); *F01N 2610/00* (2013.01)

(58) Field of Classification Search
CPC ............ B01D 53/9418; B01D 46/0061; B01D 2255/9155; B01D 2255/20707; B01D 2255/20723; B01D 2255/20776; B01D 2255/1023; F01N 3/035; F01N 3/0233; F01N 3/0234; F01N 3/2066; F01N 3/2803; F01N 3/20; F01N 13/009; F01N 2510/06; F01N 2610/00; B01J 21/063; B01J 23/30; B01J 23/44; B01J 35/04; C04B 38/0006

See application file for complete search history.

(56) References Cited

U.S. PATENT DOCUMENTS

| | | | |
|---|---|---|---|
| 5,390,492 A | 2/1995 | Levendis | |
| 5,536,285 A | 7/1996 | Isaksson et al. | |
| 5,616,171 A | 4/1997 | Barris et al. | |
| 5,725,618 A * | 3/1998 | Shimoda | B01D 46/0063 55/283 |
| 5,785,936 A | 7/1998 | Levendis | |
| 6,638,344 B2 * | 10/2003 | Horton | B01D 46/0068 366/18 |
| 8,048,207 B1 * | 11/2011 | Streichsbier | B01D 46/0064 55/302 |
| 8,349,057 B2 * | 1/2013 | Holten | B01D 46/04 55/302 |
| 2006/0070361 A1 | 4/2006 | Sellers et al. | |
| 2012/0291799 A1 * | 11/2012 | Almlie | B01D 46/0068 134/1 |
| 2017/0211441 A1 * | 7/2017 | Johansen | B01D 46/0068 |

FOREIGN PATENT DOCUMENTS

| | | |
|---|---|---|
| WO | WO 99/10633 A1 | 3/1999 |
| WO | WO 2013/179266 A1 | 12/2013 |
| WO | WO 2014/169967 A1 | 10/2014 |

\* cited by examiner

METHOD AND SYSTEM FOR THE REMOVAL OF PARTICULATE MATTER FROM ENGINE EXHAUST GAS OR PROCESS EQUIPMENT

The present invention relates to a method and system for the removal of hydrocarbons and particulate matter in form of soot, ash and heavy metals being present in exhaust gas from an engine or process equipment such as cement production. In particular the invention is useful for the removal of these components from the exhaust of an engine operated on heavy fuel oil with a sulphur content of 0.1% to 4.0 wt % and a heavy metal content of 5 mg/kg to 1000 mg/kg.

Soot and ash are typically captured and removed by passing the exhaust through one or more filters arranged in the exhaust system. After a certain time on stream the captured amounts of soot and ash cause an increasing pressure drop over the filters and the filters need to be regenerated by burning off the soot and blowing off the ash with compressed air or by a manual process.

The known particulate filter systems are developed for diesel engine exhaust with a relatively low sulphur and ash content. These systems cannot be employed for e.g. maritime engines fuelled with heavy fuel oil, the so called bunker oil.

Bunker oil contains very heavy hydrocarbons and polyaromatic compounds. The oil is heavily contaminated with compounds, which do not burn and end as ash in the exhaust. Further contaminants contained in bunker oil include not only water soluble metal salts sodium (Na), potassium (K), calcium (Ca), iron (Fe), sulfates ($MeSO_4$), and several others, but also the oil soluble metals vanadium (V), lead (Pb), nickel (Ni) and others.

Thus, the general object of the invention is to provide a method and system for cleaning exhaust gas resulting from process equipment or engines being fuelled with heavy fuel oil, which method and system ensures an effectively cleaning and a continuous operation of the engine, even when a particulate filter employed in the method and system needs to be regenerated. However the present invention can also be employed in other systems with a high particle load in the gas stream e.g. cement production processes.

Essential features of the invention are a continuous passive regeneration of particulate filters by catalysing the filters with soot combustion and hydrocarbon oxidation catalysts, thereby improving the fuel consumption by keeping the pressure drop over the particulate filters low and by periodically and effectively blowing off of ash by pulse injection of air into outlet of the filters. The catalysts removes sticky hydrocarbon containing soot that facilitates the ash removal.

As discussed above soot in the exhaust gas from the engine contains further inorganic ash that cannot combust and therefore will accumulate in the filter over time and build up the pressure drop. Consequently, ash must be removed by periodical reversing the flow direction of the exhaust gas through the filter or blowing off the ash by impulsed injection of air.

In summary, the invention provides a method for removal of soot, hydrocarbons, ash and heavy metals being present in exhaust gas from an engine or process equipment, comprising the steps of
passing the exhaust gas at exhaust gas temperature through the at least one filtration unit each comprising at least one particulate filter and capturing particles, soot, ash and heavy metals contained in the exhaust gas;
continuously burning the captured soot and adhered hydrocarbons off the at least one particulate filter by contact with a catalyst being arranged on the filter;
periodically opening at least one particle discharge valve in a particle discharge valve arrangement comprising a particle collector mounted at each of the inlets for the filtration units;
subsequently pulse injecting air into the outlet of at least one of the filtration units in reverse to the previous flow of the exhaust gas and blowing the particles off the at least one particulate filter;
closing the at least one particle discharge valve; and
subsequently repeating the reverse pulse process for all the one or more filtration units without shutting off said filtration units from the exhaust gas.

The particulate filters for use in the invention are preferably made from silicon carbide, cordierite, mullite, aluminium titanate or sintered metal.

Typically, the filters are shaped as wall flow filters, which ensure the highest cleaning efficiency, but other filter types may be employed.

The soot combustion catalyst is coated on or inside the filter walls.

Catalysts being active in the combustion of soot are known in the art and described inter alia in the patent literature.

A preferred catalyst comprises titanium dioxide, oxides of vanadium and tungsten and metallic palladium as further disclosed in European patent no. EP1493484 B1.

The catalyst reduces the ignition temperature of the trapped soot down to 350° C. and at optimal process conditions further down to 325° C.

An auxiliary engine can be operated at a part load, whereby the exhaust gas temperature is above 325° C. The exhaust gas temperature above 325° C. at the filter inlet thus secures passive regeneration by continuous soot combustion.

Heavy fuel oil contains large amounts of vanadium and iron acting as fuel born additives and facilitate additionally burning off the soot above 325° C. and thereby make it unnecessary to add additives to the fuel.

As mentioned above an essential feature of invention is removal of trapped ash formed during combustion of the heavy fuel oil. The particulate filters must be cleaned periodically. According to the invention this can be done without shutting off the filter to be cleaned from the exhaust gas stream, thus omitting the need for compartment valves inside the filtration assembly and with a need for less filter cassettes than known systems where the filters to be cleaned need to be shut off from the exhaust gas stream. This also renders the entire filtration assembly more compact, which may be essential in e.g. retrofitting existing filtration systems on ships to ensure compliance with increasing standards.

The blown off ash may be removed from the filter units by a proper particle discharge valve arrangement and conveyed to a container which may comprise an auxiliary filter.

All the filter units can be cleaned by the above method according to the invention in a cyclic cleaning loop. The engine or process can remain in continuous operation because all filter units remain in filtration mode at all time, even during reverse pulse cleaning of a filtration unit at a time.

During cleaning of the particulate filters, air is injected in reverse to the previous flow of the exhaust gas at an injection pulse duration of between 10 and 600 msec, preferably 300 msec.

In the cleaning cycle, air is injected into the outlet of at least one filtration unit by a nozzle. The blown off particles are collected at the inlet of the filtration unit by a particle collector.

In further an embodiment of the invention, the air for pulse injection is withdrawn from an accumulator tank with compressed air at a pressure 4 to 10 barg, preferably 6.5 barg.

In yet another embodiment, the unit/s are arranged in a pressure vessel upstream an engine turbocharger or other process equipment. The exhaust gas may then be passed through the filter unit/s at a pressure of between 0 and 3 barg.

The soot combustion temperature can in this embodiment be kept at a more optimal level about 400° C. without additional exhaust gas heating. As a further advantage, the pressure drop over the particulate filter(s) is decreased when increasing the pressure of the exhaust gas and the temperature. This results in a diminished filter volume required for effective filtration and facilitates e.g. retrofit installation on ships with limited space for exhaust gas treatment.

The filtration process is in still an embodiment additionally combined with selective catalytic reduction (SCR) of nitrogen oxides (NOX) in the exhaust gas prior to the gas is passed through the filter unit/S or after the gas has passed through the filter unit(s).

As the engine is operated above a minimum load resulting in an exhaust gas temperature of at least 325° C. the thermal mass of the SCR unit has a negligible effect on the passive regeneration of the downstream filter unit(s).

An important feature of the invention as disclosed above is the possibility to remove sulphur oxides being formed when burning heavy fuel oil in the engine. The upstream soot burning catalyst is resistant to sulphur compounds and has a limited $SO_2$ to $SO_3$ oxidation potential.

Thus, in a further embodiment the method comprises the additional step of reducing amounts of sulphur oxides contained in the exhaust gas by scrubbing the gas with an alkaline solution or sea water in an open or closed loop, downstream of the at least one filter unit. The scrubber's alkaline counter current circulating solution employed in this method step converts the sulphur oxides to harmless alkaline metal sulphates or sulphites. The sulphur oxides are thereby almost completely removed and the clear low turbidity spent solution is either discharged to the sea or accumulated for delivery on-shore.

As a further advantage, seawater can be used to mix with scrubber liquid. As heavy metals and soot are removed by the filters, the captured sulphur oxide content in the scrubber liquid can then be appropriately diluted for pH control and discharged to the sea.

The invention provides furthermore a filtration assembly for removal of particles of soot and ash being present in exhaust gas from an engine or process equipment comprising one or more exhaust gas inlet pipes connecting each the engine or process equipment with the inlet of each of the one or more filtration units;
one or more exhaust gas outlet pipes in fluid communication with the outlet of each of the one or more filtration units;
at least one particulate filter catalyzed with a catalyst for effectuating burning off of soot with adhered hydrocarbons connected in parallel within the one or more filtration units;
an air pulse jet valve arrangement mounted at the outlet of the one or more filtration units for pulse cleaning, blowing off ash from the at least one particulate filter, the air pulse jet valve arrangement comprises one or more pulse valves, one or more air blow pipes connected to an air supply and nozzles in the blow pipes for pulse injection of air through the nozzles in the blow pipes into the at least one particulate filter; and
a particle discharge valve arrangement mounted at the inlet of the one or more filtration units for collecting soot and ash from the at least one particulate filter during air pulse cleaning, said particle discharge valve arrangement comprising one or more particle discharge valves, one or more dust discharge pipes and one or more particle collectors mounted at the exhaust gas inlet of the one or more filtration units.

The reverse flow through the filter is controlled by automatic managing the jet valves at filter outlet as described below by reference to the drawings.

Preferred embodiments are disclosed in the following. These embodiments can either be employed individually or in combination.

The at least one particulate filter is in form of a wall flow filter.

The at least one particulate filter is coated on walls or inside walls with a catalyst catalysing burning of captured soot with adhered hydrocarbons of the filters.

The catalyst consists of titanium dioxide, oxides of vanadium and tungsten and metallic palladium.

Body of the at least one particulate filter is prepared from silicon carbide, cordierite, mullite, aluminium titanate or sintered metal.

The one or more air blow pipes are connected to an accumulator tank with compressed air.

The one or more filtration units are arranged in a pressure vessel upstream an engine turbocharger.

The one or more filtration units are arranged downstream an engine turbocharger.

The one or more exhaust gas outlet pipes connect the one or more filtration units to a downstream selective catalytic reduction unit comprising a denitrification (SCR) catalyst.

The one or more exhaust gas inlet pipes connect the one or more filtration units to an upstream selective catalytic reduction unit comprising a denitrification (SCR) catalyst.

The one or more exhaust gas outlet pipes connect the one or more filtration units to a scrubber unit.

A selective catalytic reduction unit comprising a denitrification (SCR) catalyst unit is connected upstream to the one or more filtration units and downstream to a scrubbing unit.

The selective catalytic reduction unit is arranged upstream an engine turbocharger.

The system comprises further a by-pass pipe by-passing the exhaust gas at least one of the one or more filtration units.

The various advantages of the different embodiments of the system according to the invention are already discussed above in connection with the disclosure of the method according to the invention.

Features of the Invention

1. Method for removal of soot, hydrocarbons, ash and heavy metals being present in exhaust gas from an engine or process equipment, comprising the steps of
passing the exhaust gas at exhaust gas temperature through the at least one filtration unit each comprising at least one particulate filter and capturing particles, soot, ash and heavy metals contained in the exhaust gas;
continuously burning the captured soot and adhered hydrocarbons off the at least one particulate filter by contact with a catalyst being arranged on the filter;
periodically opening at least one particle discharge valve in a particle discharge valve arrangement comprising a particle collector mounted at each of the inlets for the filtration unit;

subsequently pulse injecting air into the outlet of at least one of the filtration units in reverse to the previous flow of the exhaust gas and blowing the particles off the at least one particulate filter;

closing the at least one particle discharge valve; and subsequently repeating the reverse pulse process for all the one or more filtration units without shutting off said filtration units from the exhaust gas.

2. The method of feature 1, wherein the at least one particulate filter is in form of a wall flow filter.

3. The method of feature 2, wherein the catalyst is coated on or inside the walls of the at least one particulate filter.

4. The method of anyone of features 1 to 3, wherein the catalyst comprises of titanium dioxide, oxides of vanadium and tungsten and metallic palladium.

5. The method of anyone of features 1 to 4, wherein body of the at least one particulate filter is prepared from silicon carbide, cordierite, mullite, aluminium titanate or sintered metal.

6. The method of anyone of features 1 to 5, wherein the air is pulse injected with injection pulse duration of between 10 and 600 msec, preferably 300 msec and wherein the particle discharge valve is opened between 1 and 5 sec, preferably 2 sec before the injection pulse duration and closed between 2 and 15 sec, preferably 6-8 sec after the injection pulse duration.

7. The method of anyone of features 1 or 6, wherein the air for pulse injection is withdrawn from an accumulator tank with compressed air at a pressure 4 to 10 barg, preferably 6.5 barg.

8. The method of anyone of features 1 to 7, wherein the at least one filter unit is arranged in a pressure vessel upstream an engine turbocharger or a cement production process.

9. The method of feature 8, wherein the exhaust gas is passed through the at least one filter unit at a pressure of between 0 and 3 barg.

10. The method according to anyone of features 1 to 9, comprising the further step of selective catalytic reduction of nitrogen oxides in the exhaust gas prior to the gas is passed through the at least one filter unit or after the gas has passed through the at least one filter unit.

11. The method according to anyone of features 1 to 10, comprising the further step of reducing amounts of sulphur oxides contained in the exhaust gas by scrubbing the gas with an alkaline solution or sea water in an open or closed loop, downstream of the at least one filter unit.

12. Filtration assembly for removal of particles of soot and ash being present in exhaust gas from an engine or process equipment comprising one or more exhaust gas inlet pipes connecting each the engine or process equipment with the inlet of each of the one or more filtration units;

one or more exhaust gas outlet pipes in fluid communication with the outlet of each of the one or more filtration units;

at least one particulate filter catalyzed with a catalyst for effectuating burning off of soot with adhered hydrocarbons connected in parallel within the one or more filtration units;

an air pulse jet valve arrangement mounted at the outlet of the one or more filtration units for pulse cleaning, blowing off ash from the at least one particulate filter, where the air pulse jet valve arrangement comprises one or more pulse valves, one or more air blow pipes connected to an air supply and nozzles in the blow pipes for pulse injection of air through the nozzles in the blow pipes into the at least one particulate filter;

a particle discharge valve arrangement mounted at the inlet of the one or more filtration units, for collecting soot and ash from the at least one particulate filter during air pulse cleaning, the particle discharge valve arrangement comprising one or more particle discharge valves, one or more dust discharge pipes and one or more particle collectors mounted at the exhaust gas inlet of the one or more filtration units.

13. The system of feature 12, wherein the at least one particulate filter is in form of a wall flow filter.

14. The system of feature 13, the at least one particulate filter is coated on walls or inside walls with a catalyst catalysing burning of captured soot of the filters.

15. The system of anyone of features 12 to 14, wherein the catalyst consists of titanium dioxide, oxides of vanadium and tungsten and metallic palladium.

16. The system according to anyone of features 12 to 15, wherein the body of the at least one particulate filter is prepared from silicon carbide, cordierite, or mullite or aluminium titanate or sintered metal.

17. The system of anyone of features 12 to 16, wherein the one or more air blow pipes are connected to an accumulator tank with compressed air.

18. The system of anyone of features 12 to 17, wherein the one or more filtration units are arranged in a pressure vessel upstream an engine turbocharger.

19. The system of anyone of features 12 to 18, wherein the one or more filtration units are arranged downstream an engine turbocharger or a cement production process.

20. The system of anyone of features 12 to 19, wherein the one or more exhaust gas outlet pipes connect the one or more filtration units to a downstream selective catalytic reduction unit comprising a denitrification catalyst.

21. The system of anyone of features 12 to 19, wherein the one or more exhaust gas inlet pipes connect the one or more filtration units to an upstream selective catalytic reduction unit comprising a denitrification catalyst.

22. The system of anyone of features 12 to 19, wherein the one or more exhaust gas outlet pipes connect the one or more filtration units to a scrubber unit.

23. The system of anyone of features 12 to 19, wherein a selective catalytic reduction unit comprising a denitrification catalyst unit is connected upstream to the one or more filtration units and downstream to a scrubbing unit.

24. The system of anyone of features 20 to 23, wherein the selective catalytic reduction unit is arranged upstream or downstream an engine turbocharger.

25. The system of anyone of features 12 to 24, further comprising a by-pass pipe by-passing the exhaust gas at least one of the one or more filtration units.

Figure 2:
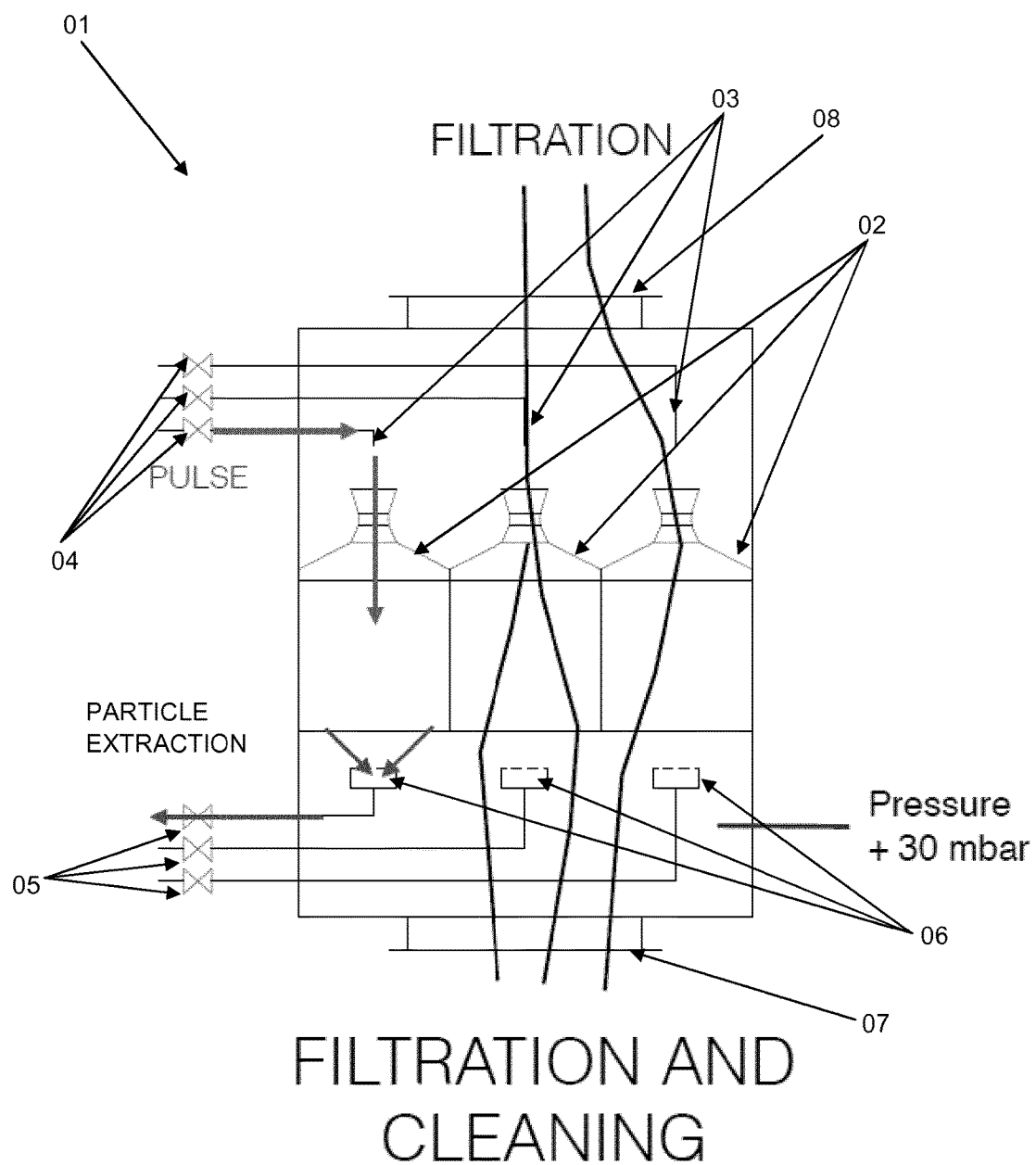

A more detailed description of the method and system will be apparent from the following description of a specific embodiment with reference to the drawings in which FIG. 1 shows a schematic flow sheet of the method and system according to the invention between cleaning pulses; and FIG. 2 shows a schematic flow sheet of the method and system according to the invention during a cleaning pulse.

POSITION NUMBERS

01. Filtration assembly
02. Filtration unit with particulate filter(s).
03. Blow pipe nozzles.
04. Air pulse jet valve arrangement.
05. Particle discharge valve arrangement.
06. Particle collector.
07. Exhaust gas inlet pipe.
08. Exhaust gas outlet pipe.

Referring now to FIG. 1, a filtration assembly is shown having three filtration units 02 with particulate filters mounted inside. Exhaust gas with particles from an engine or other process is led to the filtration assembly by the exhaust gas inlet pipe 07. Within the housing of the assembly, the exhaust gas flows through all three of the filtration units, where the particle filters retains the particles. The cleaned exhaust gas flows out of the filtration units and exits the filtration assembly by the exhaust gas outlet pipe 08.

As the particles build up during operation, the pressure loss through the particle filters increases and they need to be cleaned. This is done by shortly providing a back flush of air at a pressure high enough to provide a pulse through the particle filters in opposite direction of the exhaust gas flow. The cleaning back flush is provided to one filtration unit at a time in a cycle.

The cleaning pulse is provided by an air pulse jet valve arrangement 04, which has a blow pipe nozzle 03 mounted near or at the exit of each filtration unit, pointed in a direction towards the particle filters in reverse direction of the exhaust gas flow. The blow pipe nozzles are connected via piping to pulse valves which controls the air pulse cycle. One valve at a time opens in a short time for the flow of cleaning air back through the one or more particle filters in each of the filtration units one by one.

The particles which are released from the particle filters during each cleaning incident in the cycle is collected and extracted from the filtration assembly by particle collectors 06 which are mounted near or at the inlet of the filtration units, at least one for each filtration unit. All the particle collectors are connected by piping to the particle discharge valve arrangement 05, which conveys the particles from the filtration assembly and out to a separate container (not shown) which may have a further auxiliary filter mounted (not shown). The particle discharge valve arrangement also operates in a cycle, which is related to the air pulse cleaning cycle. I.e. before a jet pulse is blown through one of the filtration units, the particle valve connected to the particle collector of the same filtration is opened. A relative higher pressure within the filtration assembly than in the particle discharge valve arrangement provides a flow of gas from the filtration assembly and out through the opened particle collector. Shortly after a particle collector is opened and an outflow of gas is obtained through said particle collector, the related pulse valve is opened and the cleaning air pulse jet is provided to the related filtration unit, as seen on FIG. 2. In the embodiment shown in FIG. 2 the pressure difference between the filtration assembly and the particle discharge valve arrangement is 30 mbar, which drives the outflow of gas from the filtration assembly through the opened particle collector, the connected piping and further out through the opened particle discharge valve. As the particle collector is connected near or in the inlet opening of the filtration unit, the released particles due to the air jet pulse is conveyed to and through the particle collector due to the out-flow driven by the pressure difference.

As seen on FIG. 2, and essential for the invention, the exhaust gas continues to flow through the filtration assembly unhindered by the cleaning pulse, since the pulse flow is relative small compared to the total exhaust gas flow. Therefore no valves are needed to shut-off the filtration unit during pulse cleaning, it is momentarily by-passed by the exhaust gas stream due to the local pressure difference. This makes the lay-out of the filtration assembly more simple than known systems, and also renders the filtration assembly more compact, since no extra filter capacity is needed during the short back-pulse cleaning cycle, which may last only a few seconds or less than a second. To avoid that particles, soot, ash or the like contained in the exhaust gas which is passed through the one or more filtration units are fixed too hard to the filters it may be necessary to keep the exhaust gas temperature below 460° C. or preferably in the range of 380° C.-420° C. Otherwise said particles may melt or burn and thereby fix so hard to the filters that the reverse pulse flow through the filters is not able to remove the particles sufficiently to keep a base pressure drop over the filters, depending on the composition of the fuel.

It may be advantageous to install a heat exchanger upstream the one or more filtration units to ensure a sufficiently low exhaust gas temperature up-stream the filtration units.

EXAMPLES

The purpose of this test was triggered by a severe observation made on Queen Victoria where the reactor by mistake was exposed to a temperature close to 480° C. This generated a high dP across the BMC-101WF filter due to deposits of a white/yellow metal sulfate ash compounds found on the inlet surface inside the channels. This ash was difficult to remove by reverse air pulsing as the ash was stuck to the filter surface probably due to melting at this high temperature.

Especially sulfate compounds of vanadium, nickel and sodium were identified to have low melting ash phases. To reproduce these conditions and find a reliable temperature process window, metal additives of V, Na and S were added to MGO during these tests. The pressure-drop was measured at 400-420-440-460 and 480° C. (graph 7). During these different test conditions no un-expected increase in pressure drop has been observed. But at the inlet temperature 480° C. some white/yellow deposits was found on the filter connected to the SO 2/SO 3 sampling probe, which indicate the same ash deposits as seen on Queen Victoria—the oil contained 66 ppm V, 36 ppm Na, 31 ppm Ni and 2.52% S at this temperature. At the lower temperatures 400-460° C. black ash was found on inlet filter sample as expected indicating an unmelted ash with a carbon rest.

The invention claimed is:

1. Method for removal of soot, hydrocarbons, ash and heavy metals being present in exhaust gas from an engine or process equipment, comprising the steps of:
   passing the exhaust gas at exhaust gas temperature through at least one filtration unit, each comprising at least one particulate filter and capturing particles, soot, ash and heavy metals contained in the exhaust gas, wherein the at least one filtration unit is arranged in a pressure vessel upstream or downstream an engine turbocharger or a cement production process;
   continuously burning the captured soot and adhered hydrocarbons off the at least one particulate filter by contact with a catalyst being arranged on the filter;
   periodically opening at least one particle discharge valve in a particle discharge valve arrangement comprising a particle collector mounted at each of the inlets for the filtration units;
   subsequently pulse injecting air into the outlet of at least one of the filtration units in reverse to the previous flow of the exhaust gas and blowing the particles off the at least one particulate filter;
   closing the at least one particle discharge valve; and
   subsequently repeating the reverse pulse process for all the one or more filtration units without shutting off said filtration units from the exhaust gas.

2. The method of claim 1, wherein the at least one particulate filter is in form of a wall flow filter.

3. The method of claim 2, wherein the catalyst is coated on or inside the walls of the at least one particulate filter.

4. The method of claim 1, wherein the catalyst comprises of titanium dioxide, oxides of vanadium and tungsten and metallic palladium.

5. The method of claim 1, wherein body of the at least one particulate filter is prepared from silicon carbide, cordierite, mullite, aluminium titanate or sintered metal.

6. The method of claim 1, wherein the air is pulse injected with injection pulse duration of between 10 and 600 msec, and wherein the particle discharge valve is opened between 1 and 5 sec before the injection pulse duration and closed between 2 and 15 sec after the injection pulse duration.

7. The method of claim 1, wherein the air for pulse injection is withdrawn from an accumulator tank with compressed air at a pressure 4 to 10 barg.

8. The method of claim 1, wherein the exhaust gas is passed through the at least one filtration unit at a pressure of between 0 and 3 barg.

9. The method of claim 1, comprising the further step of selective catalytic reduction of nitrogen oxides in the exhaust gas prior to the gas is passed through the at least one filtration unit or after the gas has passed through the at least one filtration unit.

10. The method according to claim 1, comprising the further step of reducing amounts of sulphur oxides contained in the exhaust gas by scrubbing the gas with an alkaline solution or sea water in an open or closed loop, downstream of the at least one filtration unit.

11. The method according to claim 1, wherein the exhaust gas temperature of the exhaust gas which is passed through the at least one filtration unit is kept in the temperature range of 380° C.-420° C. to avoid that any particles, soot, ash and heavy metals contained in the exhaust gas are fixed too hard to said filtration unit for the reverse pulse to remove them.

12. Filtration assembly for removal of particles of soot and ash present in exhaust gas from an engine or process equipment, comprising:
   one or more exhaust gas inlet pipes connecting each the engine or process equipment with the inlet of each of one or more filtration units, wherein the one or more filtration units are arranged in a pressure vessel upstream or downstream an engine turbocharger or a cement production process;
   one or more exhaust gas outlet pipes in fluid communication with the outlet of each of the one or more filtration units;
   at least one particulate filter catalyzed with a catalyst for effectuating burning off of soot with adhered hydrocarbons connected in parallel within the one or more filtration units;
   an air pulse jet valve arrangement mounted at the outlet of the one or more filtration units for pulse cleaning, blowing off ash from the at least one particulate filter, where the air pulse jet valve arrangement comprises one or more pulse valves, one or more air blow pipes connected to an air supply and nozzles in the blow pipes for pulse injection of air through the nozzles in the blow pipes into the at least one particulate filter; and
   a particle discharge valve arrangement mounted at the inlet of the one or more filtration units, for collecting soot and ash from the at least one particulate filter during air pulse cleaning, said particle discharge valve arrangement comprising one or more particle discharge valves, one or more dust discharge pipes and one or more particle collectors mounted at the exhaust gas inlet of the one or more filtration units.

13. The system of claim 12, wherein the at least one particulate filter is in form of a wall flow filter.

14. The system of claim 13, wherein the at least one particulate filter is coated on walls or inside walls with a catalyst catalysing burning of captured soot of the filters.

15. The system of claim 12, wherein the catalyst consists of titanium dioxide, oxides of vanadium and tungsten and metallic palladium.

16. The system according to claim 12, wherein the body of the at least one particulate filter is prepared from silicon carbide, cordierite, or mullite or aluminium titanate or sintered metal.

17. The system of claim 12, wherein the one or more air blow pipes are connected to an accumulator tank with compressed air.

18. The system of claim 12, wherein the one or more exhaust gas outlet pipes connect the one or more filtration units to a downstream selective catalytic reduction unit comprising a denitrification catalyst.

19. The system of claim 12, wherein the one or more exhaust gas inlet pipes connect the one or more filtration units to an upstream selective catalytic reduction unit comprising a denitrification catalyst.

20. The system of claim 12, wherein the one or more exhaust gas outlet pipes connect the one or more filtration units to a scrubber unit.

21. The system of claim 12, wherein a selective catalytic reduction unit comprising a denitrification catalyst unit is connected upstream to the one or more filtration units and downstream to a scrubbing unit.

22. The system of claim 12, wherein the selective catalytic reduction unit is arranged upstream or downstream an engine turbocharger.

23. The system of claim 12, further comprising a by-pass pipe by-passing the exhaust gas at least one of the one or more filtration units.

24. The system of claim 12, wherein a heat exchanger is arranged up-stream the one or more filtration units to ensure that the exhaust gas temperature of the exhaust gas which is passed through said filtration units is kept below 420° C.

* * * * *